United States Patent
Yaoi et al.

(10) Patent No.: US 8,221,872 B2
(45) Date of Patent: Jul. 17, 2012

(54) EASY-OPEN END

(75) Inventors: Etsuko Yaoi, Yokohama (JP); Satoshi Fujita, Yokohama (JP); Akio Kuroda, Chiyoda-ku (JP); Kouji Katou, Yokohama (JP); Toshio Sue, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1075 days.

(21) Appl. No.: 12/090,503

(22) PCT Filed: Sep. 28, 2006

(86) PCT No.: PCT/JP2006/319901
§ 371 (c)(1),
(2), (4) Date: Apr. 29, 2008

(87) PCT Pub. No.: WO2007/046240
PCT Pub. Date: Apr. 26, 2007

(65) Prior Publication Data
US 2009/0047501 A1  Feb. 19, 2009

(30) Foreign Application Priority Data
Oct. 19, 2005  (JP) ................................. 2005-303995

(51) Int. Cl.
*B32B 15/08*   (2006.01)
*B32B 15/092*  (2006.01)
*B32B 27/08*   (2006.01)
*B32B 27/36*   (2006.01)
*B32B 27/38*   (2006.01)

(52) U.S. Cl. ........ 428/216; 428/212; 428/213; 428/323; 428/334; 428/336; 428/339; 428/413; 428/414; 428/416; 428/418; 428/457; 428/458; 428/480; 428/910

(58) Field of Classification Search ........................ None
See application file for complete search history.

(56) References Cited

U.S. PATENT DOCUMENTS

| | | | | |
|---|---|---|---|---|
| 3,663,354 A * | 5/1972 | Ueno et al. | | 525/481 |
| 3,762,598 A | 10/1973 | Gayner et al. | | |
| 3,832,962 A * | 9/1974 | Rolles | | 72/46 |
| 3,936,342 A * | 2/1976 | Matsubara et al. | | 156/330 |
| 3,993,841 A * | 11/1976 | Matsubara et al. | | 428/418 |
| 4,177,323 A * | 12/1979 | Obi et al. | | 428/622 |
| 4,302,373 A * | 11/1981 | Steinmetz | | 523/409 |
| 4,762,245 A * | 8/1988 | Matsubayashi et al. | | 220/269 |

(Continued)

FOREIGN PATENT DOCUMENTS
EP       0474240 A2       3/1992
(Continued)

*Primary Examiner* — Vivian Chen
(74) *Attorney, Agent, or Firm* — Sughrue Mion, PLLC

(57) ABSTRACT

An easy-open end comprising a resin-coated metal plate obtained by coating a metal substrate with a anti-blocking agent-containing biaxially drawn film via a primer, wherein an important feature resides in that the anti-blocking agent in the biaxially drawn film is of a spherical shape having an average particle size of 0.5 to 2.5 μm and an average particle size ratio (long diameter/short diameter) in a range of 1.0 to 1.2, and is contained at a ratio of 0.05 to 0.5% by weight in the biaxially drawn film. Even without forming a top-coat layer, therefore, the film is not scratched or the forming-tool is not damaged by the anti-blocking agent that adheres and deposits on the forming tool. Besides, the resin coating favorably adheres to the metal plate offering excellent advantage in production and in economy.

4 Claims, 2 Drawing Sheets

U.S. PATENT DOCUMENTS

| | | | | |
|---|---|---|---|---|
| 4,812,537 | A * | 3/1989 | Maki | 525/488 |
| 5,010,149 | A * | 4/1991 | Morita et al. | 525/481 |
| 5,264,503 | A * | 11/1993 | Marx | 525/530 |
| 5,653,357 | A * | 8/1997 | Miyazawa et al. | 220/62.11 |
| 5,700,529 | A * | 12/1997 | Kobayashi et al. | 428/35.8 |
| 6,025,056 | A * | 2/2000 | Machii et al. | 428/204 |
| 6,127,473 | A * | 10/2000 | Yoshida et al. | 524/493 |
| 6,555,628 | B2 * | 4/2003 | Gan et al. | 525/523 |
| 7,063,889 | B2 * | 6/2006 | Yoshida et al. | 428/327 |

FOREIGN PATENT DOCUMENTS

| | | | |
|---|---|---|---|
| EP | 0940425 | A1 | 9/1999 |
| EP | 1260356 | A1 | 11/2002 |
| JP | 48-49590 | A | 7/1973 |
| JP | 62-52045 | A | 3/1987 |
| JP | 02-242865 | * | 9/1990 |
| JP | 3-98844 | A | 4/1991 |
| JP | 10-120760 | * | 5/1998 |
| JP | 11-172194 | * | 6/1999 |
| JP | 11-172194 | A | 6/1999 |
| JP | 2000-109750 | * | 4/2000 |
| JP | 2001-158436 | A | 6/2001 |
| JP | 2002-206079 | A | 7/2002 |
| JP | 2002-302558 | * | 10/2002 |
| JP | 2002-302558 | A | 10/2002 |

* cited by examiner

EASY-OPEN END

TECHNICAL FIELD

The present invention relates to an easy-open end made of a resin-coated metal plate. More particularly, the invention relates to an easy-open end which does not require the formation of a top-coat layer on the inner surface, and is advantageous in productivity and economy.

BACKGROUND ART

A so-called easy-open end has heretofore been widely used as a container end that can be easily opened by hand without using any particular utensils. From the standpoint of workability, the container end is made of a metal blank such as a tin plate, a surface-treated steel plate like TFS or a resin-coated metal plate obtained by coating an aluminum alloy with a resin coating such as a polyester film, the container end made of the above metal plate being provided with a score extending in the way in the direction of thickness of the metal plate so as to sectionalize a portion for opening. A rivet is formed by the end plate in the portion for opening, a pull-tab is fixed by the rivet, and the end is double-seamed with the flange such as a can body member.

The easy-open end is made of a resin-coated metal plate obtained by coating a metal plate with a polyester film via an adhesive primer as disclosed in JP-A-62-52045. Here, as disclosed in, for example, JP-A-2002-302558, an anti-blocking agent (releasing agent) is added to the polyester film in order to prevent the occurrence of wrinkles at the time of taking up the film that is formed. However, the anti-blocking agent deposits on a forming tool in the step of forming rivets causing the film to be scratched. Therefore, a top-coat layer is formed on the inner surface of the resin-coated metal plate in order to prevent the anti-blocking agent from adhering on the forming tool.

DISCLOSURE OF THE INVENTION

In forming the easy-open end by using a resin-coated metal plate coated with a polyester resin, however, if the above-mentioned problem does not stem from the anti-blocking agent contained in the film, then, the top-coat layer is not necessary. If the top-coat layer can be omitted, advantage is obtained in productivity and in economy.

So far, further, the adhesive primer layer has been heated simultaneously with the heating for forming the top-coat layer. If the top-coat layer is not formed, therefore, a problem arouses in that the adhesive primer layer that has heretofore been used is not heated to a sufficient degree.

It is therefore an object of the present invention to provide an easy-open end which features excellent productivity and economy without causing the film to be scratched or without causing the forming tool to be damaged by the deposition of a anti-blocking agent despite no top-coat layer is formed, and enabling the metal plate to be favorably coated with a resin maintaining good adhesion.

According to the present invention, therefore, there is provided an easy-open end comprising a resin-coated metal plate obtained by coating a metal substrate with a anti-blocking agent-containing biaxially drawn film via a primer, wherein:

the anti-blocking agent is of a spherical shape having an average particle size of 0.5 to 2.5 μm and an average particle size ratio (long diameter/short diameter) in a range of 1.0 to 1.2, and is contained at a ratio of 0.05 to 0.5% by weight in the biaxially drawn film, and no top-coat layer is formed on the biaxially drawn film.

In the easy-open end of the invention, it is desired that:
1. The biaxially drawn film is any one of a polyethylene terephthalate, isophthalic acid-copolymerized polyethylene terephthalate, naphthalenedicarboxylic acid-copolymerized polyethylene terephthalate, or a blend of polyethylene terephthalate/polybutylene terephthalate;
2. The primer is the one obtained by blending a single-terminal-modified epoxy resin having a number average molecular weight in a range of 3,000 to 8,000 and an alkali resole-type phenol resin at a ratio (weight ratio) of 95:5 to 50:50;
3. The primer has a thickness of 0.3 to 3 μm; and
4. The biaxially drawn film has a thickness of 10 to 40 μm.

According to the present invention, the anti-blocking agent contained in the polyester film does not adhere or deposit on the forming tool even without forming the top-coat layer that had to be formed so far on the polyester film on the inner surface side of the resin-coated metal plate. Therefore, there is provided an easy-open end preventing damage to the resin coating and featuring excellent corrosion resistance.

According to the easy-open end of the invention, there is no need of forming the top-coat layer and, therefore, the step for forming the top-coat layer can be omitted and, besides, the forming tool is prevented from being damaged, offering great advantage in productivity.

Further, use of a particular primer gives excellent anti-feathering property, suppresses the elution of low-molecular components and odor to a favorable degree and maintains sanitation.

In the easy-open end of the present invention, an important feature resides in that the anti-blocking agent contained in the biaxially drawn film covering the metal substrate via the primer is of the spherical shape having an average particle size of 0.5 to 2.5 μm and an average particle size ratio (long diameter/short diameter) in a range of 1.0 to 1.2, and is contained at a ratio of 0.05 to 0.5% by weight in the biaxially drawn film. This makes it possible to effectively prevent the anti-blocking agent from adhering and depositing on the forming tool which so far caused the resin coating to be scratched even without forming the top-coat layer on the biaxially drawn film.

In the present invention, it is important that the average particle size of the anti-blocking agent, average particle size ratio (long diameter/short diameter) and blending amount all lie within the above-mentioned ranges. If even any one of them does not lie in the above range, the above-mentioned action and effect of the invention are not obtained.

Namely, as will become obvious from Examples described later, even when the average particle size ratio and the blending amount are within the above ranges, fine scratches occur in the forming tool and the film adheres and deposits if the average particle size is smaller than the above range arousing a new problem (Comparative Example 1). On the other hand, when the average particle size is greater than the above range, the forming tool is scratched, the film is damaged when it is being formed and the metal is exposed (Comparative Example 5).

Further, even when the average particle size and the blending amount are within the above ranges, fine scratches occur in the forming tool and the film adheres and deposits if the average particle size ratio (long diameter/short diameter) lies outside the above range (Comparative Example 6). Further, even when the average particle size and the average particle size ratio are within the above ranges, the film adheres on the forming tool if the blending amount is smaller than the above range (Comparative Examples 2 and 4). When the blending amount is greater than the above range, further, fine scratches occur in the forming tool (Comparative Example 3).

When the anti-blocking agent is aggregated, the anti-blocking agent adheres and deposits on the forming tool even when the average particle size and the blending amount are within the above ranges, and the film is damaged and the metal is exposed (Comparative Examples 7).

The present invention uses the biaxially drawn film blended with the above-mentioned anti-blocking agent to solve the problem of scratching the film caused by the adhesion and deposition of anti-blocking agents on the forming tool. Here, it is desired that the adhesive primer for adhering the biaxially drawn film blended with the anti-blocking agent to the metal plate, is the one obtained by blending a single-terminal-modified epoxy resin having a number average molecular weight in a range of 3,000 to 8,000 and an alkali resole-type phenol resin at a ratio (weight ratio) of 95:5 to 50:50.

This makes it possible to coat the metal plate with the anti-blocking agent-containing biaxially drawn film maintaining good adhesion without the need of heating that is effected when the top-coat layer is to be formed and, therefore, to provide an easy-open end featuring excellent adhesion of the film and excellent corrosion resistance.

Further, the cured film comprising the primer offers such advantages as excellent anti-feathering property, suppressing the formation of low-molecular components caused by decomposition and which tend to easily elute into the content, and suppressing odor and maintaining sanitation (Examples 1 to 5, 7 to 11, Comparative Examples 1 to 10).

BEST MODE FOR CARRYING OUT THE INVENTION

Anti-Blocking Agent-Containing Biaxially Drawn Film

Figure 1:
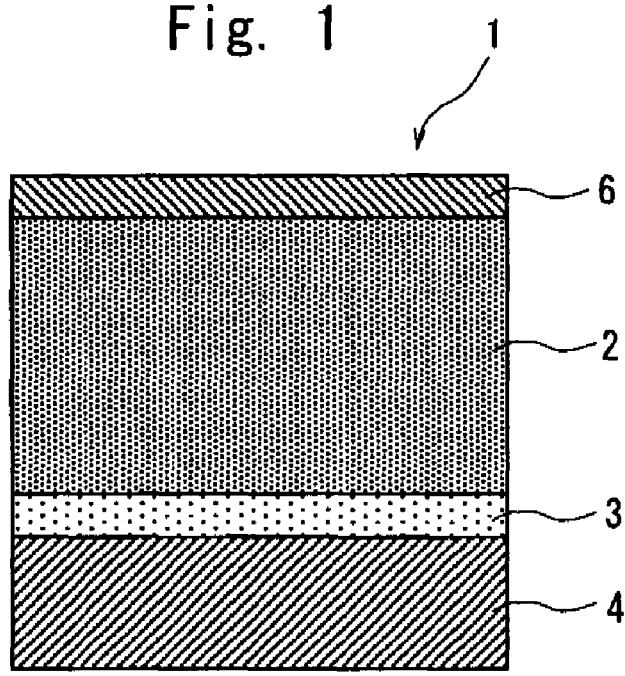
FIG. 1 is a view illustrating a sectional structure of a resin-coated metal plate used for an easy-open end of the present invention.

A biaxially drawn film which is a coating resin used for the resin-coated metal plate of which the easy-open end of the invention is made may be a film of a thermoplastic resin that has heretofore been used for the resin-coated metal plates and, particularly, a film of a polyester resin.

The polyester resin may be a homopolyethylene terephthalate or may be a simple substance of copolymerized polyester containing an acid component other than the terephthalic acid in an amount of not larger than 30 mol % based on the acid component or containing an alcohol component other than the ethylene glycol in an amount of not larger than 30 mol % based on the alcohol component, or may be a blend thereof.

As the acid component other than the terephthalic acid, there can be exemplified isophthalic acid, naphthalenedicarboxylic acid, cyclohexanedicarboxylic acid, P-β-oxyethoxybenzoic acid, diphenoxyethane-4,4'-dicarboxylic acid, 5-sodium sulfoisophthalic acid, hexahydroterephthalic acid, succinic acid, adipic acid, sebacic acid, dodecanedioic acid, dimeric acid, trimellitic acid and pyromellitic acid.

As the alcohol component other than the ethylene glycol, there can be exemplified glycol components such as propylene glycol, 1,4-butanediol, neopentyl glycol, 1,6-hexylene glycol, diethylene glycol, triethylene glycol, cyclohexanedimethanol, ethylene oxide adduct of bisphenol A, trimethylolpropane, and pentaerythritol.

The polyester must have a molecular weight in a range for forming a film, and must desirably have an inherent viscosity [η] of not smaller than 0.5 dL/g and, particularly, in a range of 0.52 to 0.70 dL/g as measured by using a phenol/tetrachloroethane mixed solvent as a solvent from the standpoint of barrier property against corrosive components and mechanical properties.

Desirably, the polyester is any one of a polyethylene terephthalate, an isophthalic acid-copolymerized polyethylene terephthalate, a naphthalene dicarboxylic acid-copolymerized polyethylene terephthalate, or a blend of polyethylene terephthalate/polybutylene terephthalate. These resins particularly preferably adhere to the primer and features excellent shearing property when the score portion is to be broken, making it possible to improve anti-feathering property.

According to the present invention as described earlier, it is important that the biaxially drawn film is blended with a spherical anti-blocking agent having an average particle size of 0.5 to 2.5 μm and an average particle size ratio (long diameter/short diameter) in a range of 1.0 to 1.2 at a ratio of 0.05 to 0.5% by weight.

When the average particle size of the anti-blocking agent is larger than the above range, coarse pinholes permitting the metal to be exposed at the time of forming the easy-open end, e.g., at the time of forming the score and rivet. When the average particle size is smaller than the above range, on the other hand, the film lacks slipping property and cannot be smoothly formed. Therefore, the film develops wrinkles, involves hindrance when it is to be laminated and, besides, adheres and deposits on the forming tool.

The anti-blocking agent may be any one of a variety of kinds so far as the above particle size is satisfied, and may be the inorganic one such as silica, alumina, titanium dioxide, calcium carbonate or barium sulfate, or may be the organic one such as crosslinked silicone resin or crosslinked polystyrene resin. In particular, truly spherical silica, truly spherical silicon or truly spherical calcium carbonate can be preferably used.

The biaxially drawn film may be blended with, in addition to the above anti-blocking agent, blending agents known per se. for the films, such as antiblocking agent, pigment, antistatic agents, and antioxidant according to a known recipe.

It is desired that the anti-blocking agent-containing biaxially drawn film is drawn, usually, by 3 to 5 times in the transverse direction and by 3 to 5 times in the longitudinal direction and, further, has a thickness, usually, in a range of 10 to 40 μm.

When the thickness of the film is larger than the above range, the film may be drawn without being cut at the time of breaking the score portion and causing the anti-feathering property to decrease, which is not desirable even from the standpoint of economy. When the thickness of the film is smaller than the above range, on the other hand, the metal may be exposed at the time of forming the end.

In the present invention, the anti-blocking agent-containing biaxially drawn film may be positioned as a surface layer on the inner surface side of the easy-open end, and can be obtained in a double-layer constitution forming a lower layer on the side of the metal plate.

Any one of the above-mentioned polyester resin can be used as the lower layer. From the standpoint of workability, adhesion and anti-denting property, however, it is desired that the lower layer is made of a polyester resin comprising chiefly an ethylene terephthalate unit and containing at least one of an isopthalic acid or a naphthalenedicarboxylic acid in an amount of 1 to 30 mol %, which is not smaller than the amount of the acid component contained in the biaxially drawn film that is the upper layer.

When the two-layer constitution is employed, it is desired that the lower layer has a thickness in a range of 5 to 32 μm, and the thickness ratio of the upper layer and the lower layer is in a range of 1:1 to 1:4, from the standpoint of workability and corrosion resistance.

(Primer)

In the present invention, it is important that the primer for adhering the anti-blocking agent-containing biaxially drawn film to the metal plate excellently adheres to both the metal plate and the polyester film, and undergoes the curing in a short period of time from the standpoint of omitting the top-coat layer that was formed so far. In the present invention, the primer is preferably the one obtained by blending a single-terminal-modified epoxy resin having a number average molecular weight in a range of 3000 to 8000 and an alkali resole-type phenol resin at a ratio (weight ratio) of 95:5 to 50:50 and, particularly, 80:20 to 65:35.

The primer can be cured within a short period of time and markedly suppresses the amount of elution of low-molecular components such as bisphenol A, and can be favorably used for the easy-open ends of the cans for containing, particularly, foods and beverages.

There is no particular limitation on the epoxy resin, and there can be used, for example, bisphenol A-type epoxy resin, bisphenol F-type epoxy resin, brominated epoxy resin, and cyclic aliphatic epoxy resin. Usually, however, either the bisphenol A-type epoxy resin or the bisphenol F-type epoxy resin is used.

As the modifying agent, there can be used phenols such as phenol, p-alkylphenol and p-tertiary butylphenol, or bisphenol and organic acids. As the preferred modifying agent, there can be used phenol, p-cresol or p-tertiary butylphenol.

In the single-terminal-modified epoxy resin constituting the primer that is used in the present invention, an epoxy group of one terminal is modified to obtain an epoxy resin, making it possible to decrease the amount of low-molecular components formed by decomposition that easily migrate into the content in the can from the cured film and, therefore, to obtain the cured film featuring excellent sanitation and suppressing odor. A both-terminal-modified product possesses decreased reaction points with phenols used for the curing agent and is little likely to take part in the crosslinking reaction when the film is to be cured and may, therefore, impair sanitation and odor-suppressing property, which is not desirable. In the epoxy resin of which the terminals are not modified, the-both-terminal modified product forms low-molecular decomposition components in increased amounts and may impair the odor-suppressing property.

It is particularly desired that the single-terminal-modified epoxy resin has a number average molecular weight in a range of 3000 to 8000 as described above. When the number average molecular weight is larger than the above range, the adhesion thereof to the metal decreases and the anti-feathering property may be deteriorated. When the number average molecular weight is smaller than the above range, on the other hand, the primer becomes so brittle that it may undergo the cohesive breakdown when opened, causing the anti-feathering property to be deteriorated.

As the alkali resole-type phenol resin, on the other hand, there can be used the one obtained by reacting phenols with aldehydes in the presence of a catalyst. As the phenols, there can be exemplified o-cresol, p-cresol, p-phenylphenol, p-nonylphenol, 2,3-xylenol, 2,5-xylenol, phenol, m-cresol, 3,5-xylenol, bisphenol A and bisphenol F. As the aldehydes, there can be exemplified formaldehyde and acetaldehyde.

The primer used in the present invention can be obtained by mixing the above single-terminal-modified epoxy resin and the alkali resole-type phenol resin at the above-mentioned ratio and pre-condensing them together by adding, as required, a catalyst thereto.

The ratio of the single-terminal-modified epoxy resin and the alkali resole-type phenol is desirably in a range of a ratio (weight ratio) of 95:5 to 50:50 and, particularly, 80:20 to 65:35. When the amount of the epoxy resin is greater than the above range, the primer is cured insufficiently and its adhesion to the metal decreases causing the anti-feathering property to be deteriorated. When the amount of the epoxy resin is smaller than the above range, on the other hand, the phenol may undergo the self-condensation and the primer often becomes brittle.

As the catalyst, there can be used phosphoric acid, hydrochloric acid, sulfuric acid, paratoluenesulfonic acid, dodecylbenzenesulfonic acid, oxalic acid and acetic acid.

The primer layer desirably has a thickness of, usually, 0.3 to 3 μm, and may be formed on the metal blank in advance or may be formed on the biaxially drawn film or on the lower layer film. When the thickness of the primer layer is larger than the above range, the primer in the forming portion may undergo the cohesive breakage causing exfoliation under the film and defective formation. When the thickness of the primer layer is smaller than the above range, on the other hand, the adhesion decreases and the anti-feathering property is deteriorated.

(Metal Plate)

The present invention uses, as a metal plate, various surface-treated steel plates or a light metal plate such as of an aluminum alloy. As the surface-treated steel plate, there can be used the one obtained by annealing a cold-rolled steel plate followed by the secondary cold rolling, and treating the surfaces thereof relying on one or two or more kinds of zinc plating, tin plating, nickel plating, electrolytic chromate treatment and chromate treatment. There can be further used an aluminum-coated steel plate which is plated with aluminum or is subjected to the aluminum rolling. As the light metal plate, there is used an aluminum alloy plate in addition to the so-called aluminum plate. Concrete examples of the aluminum alloy plate include aluminum, aluminum-copper alloy, aluminum-manganese alloy, aluminum-silicon alloy, aluminum-magnesium alloy, aluminum-magnesium-silicon alloy, aluminum-zinc alloy, aluminum-zinc-magnesium alloy, a core material of an aluminum alloy and a clad material a pure aluminum layer having an aluminum purity of not less than 99.5%. It is further desired to form a film on the surfaces of the aluminum member through the inorganic surface treatment such as chromium phosphate treatment, zirconium phosphate treatment or phosphate treatment, through the organic surface treatment such as polyacrylate treatment, phenol resin treatment or tannate treatment, or through the combination of above treatments.

The initial thickness of the metal plate may differ depending upon the kind of the metal, use or size of the container but is, usually, 0.10 to 0.50 mm. When the metal plate is a surface-treated steel plate, it is desired that the thickness thereof is 0.10 to 0.30 mm. When the metal plate is a light metal plate, it is desired that the thickness thereof is 0.15 to 0.40 mm.
(Resin-Coated Metal Plate)

FIG. 1 is a view illustrating a sectional structure of a resin-coated metal plate used for the easy-open end of the present invention. The resin-coated metal plate of the invention generally designated at 1 includes a metal plate 2 and a anti-blocking agent-containing biaxially drawn film 4 formed, via a primer layer 3, on the surface of the metal plate 2 on the side that becomes the inside of the easy-open end. A protection film 6 is formed on the surface of the metal plate 2 on the side that becomes the outer surface of the easy-open end.

Figure 2:
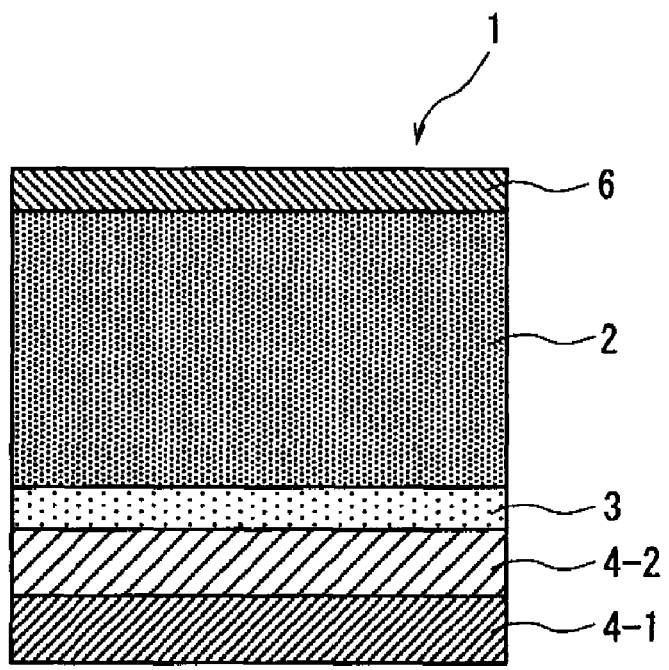
FIG. 2 is a view illustrating another sectional structure of the resin-coated metal plate used for the easy-open end of the present invention.

FIG. 2 illustrates the resin-coated metal plate of FIG. 1 but in which the anti-blocking agent-containing biaxially drawn film 4 has a two-layer constitution including an upper layer 4-1 and a lower layer 4-2 on the side of the primer layer 3.

The resin-coated metal plate used in the invention is obtained by, first, preparing the above-mentioned anti-blocking agent-containing biaxially drawn film according to a known method and by laminating it on the metal plate which has been coated with the primer, or by applying the primer onto the anti-blocking agent-containing biaxially drawn film and by laminating it on the metal plate.
(Easy-Open End)

The easy-open end of the invention can be formed in a customary manner with the exception of placing the surface of the resin-coated metal plate on which the anti-blocking agent-containing biaxially drawn film is formed to be on the inside of the end. The easy-open end of the invention may be either of the full-open type or the partial-open type.

The easy-open end is formed by, first, punching the resin-coated metal plate into a disk through the press-forming step, which is, then, formed into an end of a desired shape. Next, in a step of engraving a score, the score is engraved from the outer surface side of the end so that the score reaches in the way in the direction of thickness of the metal blank by using a score dies. In the step of forming a rivet, a rivet is formed in the to-be-opened portion sectionalized by the score so as to protrude to the outer surface by using a rivet-forming dies. In the step of attaching a tab, the tab for opening is fitted to the rivet and is fixed by using the protruded portion of the rivet to thereby form an easy-open end.

Figure 3:
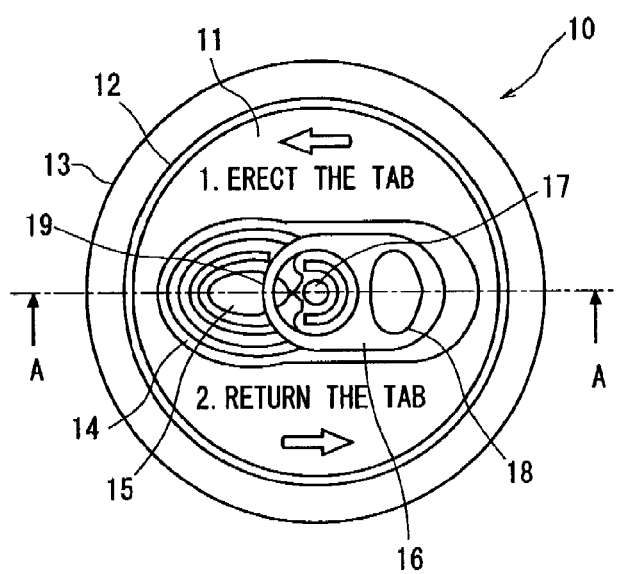
FIG. 3 is a top view of the easy-open end of the present invention.
Figure 4:
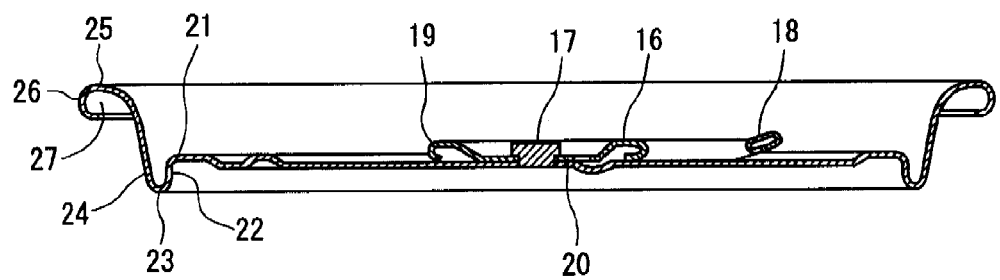
FIG. 4 is an enlarged sectional view along the line A-A in FIG. 3.

FIGS. 3 and 4 illustrate an easy-open end of the partial-open type which is an example of the easy-open end of the invention, wherein FIG. 3 is a top view and FIG. 4 is a sectional view along the line A-A in FIG. 3.

The easy-open end of the invention generally designated at 10 includes a central panel portion 11, a reinforcing ring-like groove 12, and an outermost circumferential wrap-seamed portion 13. The central panel portion 11 has a to-be-opened portion 15 surrounded by a score 14, and a tab 16 for opening is fixed via a rivet 17. The tab 16 for opening has a grip ring 18, an end 19 for pushing and a rivet-fixing tongue piece 20, the end 19 for pushing being so attached as to be overlapped on the to-be-opened portion 15. The reinforcing ring-like groove 12 extends from the central panel portion 11 through a central panel radius portion 21 and includes an inner wall portion 22, a radius portion 23 and an outer wall portion (chuck wall) 24. The outer wall portion 24 is continuous to a seaming panel portion 25 and to a curl portion 26. A groove 27 is formed on the back sides of the seaming panel portion 25 and of the curl portion 26. The groove 27 is lined with a sealing composition (not shown) to accomplish the sealing relying on a double seaming with a can body flange (not shown).

EXAMPLES

Washing the Aluminum Alloy Plate

A commercially available aluminum-manganese alloy plate (JIS 5021, plate thickness: 0.25 mm) was treated by spraying a commercially available strongly alkaline dewaxing agent "Fine Cleaner 4377" (trademark, manufactured by Nihon Parkerizing Co.) under the conditions of a chemical concentration of 20 g/L, treating temperature of 60° C. and a treating time of 7 seconds. Thereafter, the alkali component remaining on the surface was washed away with the tap water.

Treating the Aluminum Alloy Plate

The above aluminum alloy plate was treated by spraying a surface-treating solution "Alchrome K 702" manufactured by Nihon Parkerizing Co. at a temperature of 50° C. to 60° C. for 1 second to 5 seconds. The unreacted products were washed away with the tap water. The aluminum alloy plate was further washed with the deionized water of $3,000,000\Omega$ or greater, followed by drying at 80° C. to obtain the surface-treated aluminum plate.

Preparation of the Primers

500 Parts by weight of an epoxy resin, Epikote 1010 (molecular weight: 5500, epoxy equivalent: 4000) produced by Japan Epoxy resin Co. and 20 parts by weight of a p-tertiarybutylphenol were introduced into a reactor, heated up to 60° C. with stirring and, thereafter, a sodium hydroxide solution of a concentration of 10% by weight was added in an amount of 0.4 parts by weight thereto, and the temperature was gradually elevated up to 140° C. to start the polymerization. The temperature was further elevated up to 170° C. When the viscosity of the content became constant, the content was taken out and was cooled down to room temperature to obtain an epoxy resin of which the single terminal had been modified with the p-tertiarybutylphenol (molecular weight: 5700, epoxy equivalent: 7300).

500 Parts by weight of a p-cresol and 250 parts by weight of formalin were reacted together in the presence of a magnesium hydroxide catalyst. The reaction product was refined and was dissolved in a solvent to obtain a resole-type phenol-formaldehyde resin solution.

The above single-terminal-modified epoxy resin and the resole-type phenolformaldehyde resin were mixed together at a weight ratio of 70:30 on the basis of the solid component weight ratio, were pre-condensed and to which phosphoric acid was added at a ratio of 0.2 parts by weight with respect to the solid components to thereby prepare a primer (Examples 1 to 5, Comparative Examples 1 to 10).

Similarly, the above resins were mixed together at weight ratios of 40:60 to 98:2 on the basis of the second component weight ratio, were pre-condensed and to which phosphoric acid was added at a ratio of 0.2 parts by weight with respect to the solid components to thereby prepare primers (Examples 6 to 12).

Further, 500 parts by weight of the epoxy resin, Epikote 1010 (molecular weight: 5500, epoxy equivalent: 4000) produced by Japan Epoxy resin Co. and 50 parts by weight of the p-tertiarybutylphenol were introduced into the reactor, heated up to 60° C. with stirring and, thereafter, the sodium hydroxide solution of a concentration of 10% by weight was added in an amount of 0.4 parts by weight thereto, and the temperature was gradually elevated up to 140° C. to start the polymerization. The temperature was further elevated up to 170° C.

When the viscosity of the content became constant, the content was taken out and was cooled down to room temperature to obtain an epoxy resin of which both terminals had been modified with the p-tertiarybutylphenol (molecular weight: 5800, epoxy equivalent: 14000).

The above both-terminal-modified epoxy resin and the resole-type phenolformaldehyde resin were mixed together at a weight ratio of 70:30 on the basis of the solid component weight ratio, were pre-condensed and to which phosphoric acid was added at a ratio of 0.2 parts by weight with respect to the solid components to thereby prepare a primer (Example 13).

Further, the epoxy resin, Epikote 1010 produced by Japan Epoxy resin Co. and the resole-type phenolformaldehyde resin were mixed together at a weight ratio of 70:30 on the basis of the second component weight ratio, were pre-condensed and to which phosphoric acid was added at a ratio of 0.2 parts by weight with respect to the solid components to thereby prepare a primer (Example 14).

Formation of Films

A polyethylene terephthalate copolymerized with 11 mol % of isophthalic acid containing 0.1% by weight of a truly spherical silica anti-blocking agent having an average particle size of 1.5 μm and an average particle size ratio of 1.1, was melt-extruded at 260 to 290° C., and quickly cooled and solidified on a rotary drum to obtain an undrawn film. The undrawn film was, next, drawn in the longitudinal direction into 3 to 5 times at 80 to 110° C. and was, then, drawn in the transverse direction into 3 to 4 times at 90 to 130° C. Next, the film was thermally fixed at 160 to 195° C. The film after drawn possessed a thickness of 30 μm (Examples 2, 6 to 14).

Similarly, there were formed films using anti-blocking agents having different average particle sizes and different average particle size diameters and in different amounts (Examples 1, 3 to 5, Comparative Examples 1 to 10).

The average particle sizes and average particle size ratios of the anti-blocking agents were found by observing the anti-blocking agents to be used through an electron microscope to measure the particle sizes and particle size ratios (long diameter/short diameter) and by finding average values of particles of a number of n=50 particles.

Application of the Primer onto the Film

The primer was applied onto one surface of the film so that the thickness after drying was 1 μm, and was dried in an oven heated at 100° C.

Preparation of Laminated Plates

A surface-treated aluminum plate was heated at 230° C., and the isophthalic acid-copolymerized polyethylene terephthalate resin film on which the above primer has been applied was heat-laminated at a laminate roll temperature of 150° C. and a plate-passing speed of 150 m/min. in a manner that the surface coated with the primer was on the side of the aluminum plate, immediately followed by cooling with water to thereby prepare a one-surface-laminated aluminum alloy plate.

Application of a Coating Material onto the Outer Surface

An epoxyurea coating material was applied onto the non-laminated surface of the above one-surface-laminated aluminum alloy plate (so that the film thickness after drying was 3 μm) and was baked at 185° C. for 10 minutes to obtain a blank for the aluminum alloy can end.

Formation of Can Ends

The resin-coated blank for the aluminum alloy can end obtained above was punched into a disk of a diameter of 68.7 mm in such a direction that the laminated surface was the inner surface of the end. A sealing compound was applied onto a portion that becomes the inner surface side of the curl portion and was dried. Next, the outer surface side of the end was subjected to the score working of the partial-open type (remaining thickness of score: 110 μm, score width: 20 μm) and to the rivet working, and to which a tab for opening was attached to thereby obtain an easy-open end. Table 1 shows primer compositions, average particle sizes of the anti-blocking agent, shapes thereof, average particle size ratios thereof and blending amounts of Examples and Comparative Examples.

TABLE 1

|  | Lubricant | | | | Primer | |
| --- | --- | --- | --- | --- | --- | --- |
|  | Ave. particle size (μm) | Shape | Ave. particle size ratio (long diameter/ short diameter) | Blending amount (wt %) | Epoxy resin | Epoxy/ phenol ratio |
| Example 1 | 0.5 | spherical | 1.1 | 0.2 | single terminal modified | 70/30 |
| Example 2 | 1.5 | spherical | 1.1 | 0.1 | single terminal modified | 70/30 |
| Example 3 | 1.5 | spherical | 1.1 | 0.5 | single terminal modified | 70/30 |
| Example 4 | 1.5 | spherical | 1.2 | 0.5 | single terminal modified | 70/30 |
| Example 5 | 2.5 | spherical | 1.1 | 0.05 | single terminal modified | 70/30 |
| Example 6 | 1.5 | spherical | 1.1 | 0.1 | single terminal modified | 40/60 |
| Example 7 | 1.5 | spherical | 1.1 | 0.1 | single terminal modified | 50/50 |
| Example 8 | 1.5 | spherical | 1.1 | 0.1 | single terminal modified | 65/35 |
| Example 9 | 1.5 | spherical | 1.1 | 0.1 | single terminal modified | 75/25 |
| Example 10 | 1.5 | spherical | 1.1 | 0.1 | single terminal modified | 80/20 |
| Example 11 | 1.5 | spherical | 1.1 | 0.1 | single terminal modified | 95/5 |
| Example 12 | 1.5 | spherical | 1.1 | 0.1 | single terminal modified | 98/2 |
| Example 13 | 1.5 | spherical | 1.1 | 0.1 | both terminals modified | 70/30 |
| Example 14 | 1.5 | spherical | 1.1 | 0.1 | not modified | 70/30 |
| Comp. Ex. 1 | 0.1 | spherical | 1.1 | 0.5 | single terminal modified | 70/30 |
| Comp. Ex. 2 | 1.5 | spherical | 1.1 | 0.01 | single terminal modified | 70/30 |
| Comp. Ex. 3 | 1.5 | spherical | 1.1 | 0.8 | single terminal modified | 70/30 |

TABLE 1-continued

| | Lubricant | | | | Primer | |
|---|---|---|---|---|---|---|
| | Ave. particle size (μm) | Shape | Ave. particle size ratio (long diameter/short diameter) | Blending amount (wt %) | Epoxy resin | Epoxy/phenol ratio |
| Comp. Ex. 4 | 2.5 | spherical | 1.1 | 0.03 | single terminal modified | 70/30 |
| Comp. Ex. 5 | 3.0 | spherical | 1.1 | 0.05 | single terminal modified | 70/30 |
| Comp. Ex. 6 | 1.5 | spherical | 1.3 | 0.5 | single terminal modified | 70/30 |
| Comp. Ex. 7 | 2.5 | aggregated | — | 0.05 | single terminal modified | 70/30 |
| Comp. Ex. 8 | 5.1 | aggregated | — | 0.01 | single terminal modified | 70/30 |
| Comp. Ex. 9 | 8.1 | aggregated | — | 0.01 | single terminal modified | 70/30 |
| Comp. Ex. 10 | 8.1 | aggregated | — | 0.05 | single terminal modified | 70/30 |

Methods of Evaluation

The following items were evaluated, and the results were as shown in Table 2.

1. Taking-Up of Formed Films.

The film lacks slipping property and tends to develop wrinkles depending upon the average particle size and the blending amount of the anti-blocking agent. Therefore, the presence of wrinkles on the films was evaluated.
◯: No wrinkle
X: Wrinkled 2. State of the Rivet-Forming Tool.

Rivets were formed in the step of forming rivets so as to protrude toward the outer surface side of the opening portions sectionalized by the scores by using a rivet-forming dies, tabs for opening were fitted to the rivets in the step of attaching tabs and, after 100,000 pieces of rivets were formed, the state of the forming tool was evaluated, the forming tool coming in contact with the inner portion of the rivets when the tabs are to be fixed by using the protruded portions of the rivets.

3. Metal Exposure of End.

A 1% saline solution was poured as an electrolytic solution into an acrylic resin container having an electrode of a diameter that fits to the easy-open end, and the easy-open end was so mounted that no solution was leaking. Next, a voltage of 6.3 V was applied to evaluate the degree of metal exposure depending upon the amount of current A that flows (practically acceptable when the current A is 0.5 mA or smaller). Ends of a number of n=200 pieces were evaluated.
◯: $0 \leq A \leq 0.5$ mA
Δ: $0.5 < A \leq 2.0$ mA
X: $2.0$ mA$<A$ 4. Flavor Test.

A TFS two-piece can body for general foods was filled with distilled water, and an easy-open end was double-seamed therewith in a customary manner. The can body was subjected to the retort sterilization treatment (at 125° C. for 30 minutes) to evaluate the flavor.
◯: No resin flavor was felt.
X: Resin flavor was felt.

5. Feathering Test.

Easy-open ends were really opened before and after the retort sterilization treatment (at 115° C. for 60 minutes) to evaluate the occurrence of feathering L at the opening portions (practically acceptable when the feathering L is 1.5 mm or less). Each sample was evaluated in a number of n=270 pieces.
◯: $0 \leq L \leq 1.0$ mm
Δ: $1.0 < L \leq 1.5$ mm
X: $1.5$ mm$<L$

TABLE 2

| | Taking-up of formed film | State of rivet-forming tool | | Metal exposure | Feathering Opened at room temp. | Feathering After retort treatment | Flavor test |
|---|---|---|---|---|---|---|---|
| Example 1 | ◯ | ◯ | good | ◯ | ◯ | ◯ | ◯ |
| Example 2 | ◯ | ◯ | good | ◯ | ◯ | ◯ | ◯ |
| Example 3 | ◯ | ◯ | good | ◯ | ◯ | ◯ | ◯ |
| Example 4 | ◯ | ◯ | good | ◯ | ◯ | ◯ | ◯ |
| Example 5 | ◯ | ◯ | good | ◯ | ◯ | ◯ | ◯ |
| Example 6 | ◯ | ◯ | good | ◯ | X | X | X |
| Example 7 | ◯ | ◯ | good | ◯ | ◯ | ◯ | ◯ |
| Example 8 | ◯ | ◯ | good | ◯ | ◯ | ◯ | ◯ |
| Example 9 | ◯ | ◯ | good | ◯ | ◯ | ◯ | ◯ |
| Example 10 | ◯ | ◯ | good | ◯ | ◯ | ◯ | ◯ |
| Example 11 | ◯ | ◯ | good | ◯ | ◯ | ◯ | ◯ |
| Example 12 | ◯ | ◯ | good | ◯ | Δ | X | ◯ |
| Example 13 | ◯ | ◯ | good | ◯ | ◯ | X | X |
| Example 14 | ◯ | ◯ | good | ◯ | Δ | X | X |
| Comp. Ex. 1 | X | X | finely scratched and film deposited | Δ | ◯ | ◯ | ◯ |
| Comp. Ex. 2 | X | X | film deposited | Δ | ◯ | ◯ | ◯ |
| Comp. Ex. 3 | ◯ | X | finely scratched | Δ | ◯ | ◯ | ◯ |
| Comp. Ex. 4 | ◯ | X | film deposited | Δ | ◯ | ◯ | ◯ |
| Comp. Ex. 5 | ◯ | X | scratched | X | ◯ | ◯ | ◯ |
| Comp. Ex. 6 | ◯ | XX | finely scratched and film deposited | X | ◯ | ◯ | ◯ |
| Comp. Ex. 7 | ◯ | XX | lubricant deposited | X | ◯ | ◯ | ◯ |
| Comp. Ex. 8 | X | XX | lubricant and film deposited | X | ◯ | ◯ | ◯ |

TABLE 2-continued

|  | Taking-up of formed film | State of rivet-forming tool |  | Metal exposure | Feathering Opened at room temp. | Feathering After retort treatment | Flavor test |
|---|---|---|---|---|---|---|---|
| Comp. Ex. 9 | x | xx | lubricant and film deposited | x | ○ | ○ | ○ |
| Comp. Ex. 10 | ○ | xx | lubricant deposited | x | ○ | ○ | ○ |

The invention claimed is:

1. An easy-open end comprising a resin-coated metal plate obtained by coating a metal substrate with an anti-blocking agent-containing biaxially drawn film via a primer, wherein:

the anti-blocking agent is of a spherical shape having an average particle size of 0.5 to 2.5 μm and an average particle size ratio (long diameter/short diameter) in a range of 1.0 to 1.2, and is contained at a ratio of 0.05 to 0.5% by weight in the biaxially drawn film, and no top-coat layer is formed on the biaxially drawn film, and the primer is the one obtained by blending a single-terminal-modified epoxy resin having a number average molecular weight in a range of 3,000 to 8,000, the epoxy resin being modified with phenols or bisphenol, and an alkali resole-type phenol resin at a ratio (weight ratio) of 95:5 to 50:50.

2. The easy-open end according to claim 1, wherein said biaxially drawn film is any one of a polyethylene terephthalate, isophthalic acid-copolymerized polyethylene terephthalate, naphthalenedicarboxylic acid-copolymerized polyethylene terephthalate, or a blend of polyethylene terephthalate/polybutylene terephthalate.

3. The easy-open end according to claim 1, wherein said primer has a thickness of 0.3 to 3 μm.

4. The easy-open end according to claim 1, wherein said biaxially drawn film has a thickness of 10 to 40 μm.

* * * * *